(12) United States Patent
Zamsky et al.

(10) Patent No.: US 9,436,624 B2
(45) Date of Patent: Sep. 6, 2016

(54) CIRCUITRY FOR A COMPUTING SYSTEM, LSU ARRANGEMENT AND MEMORY ARRANGEMENT AS WELL AS COMPUTING SYSTEM

(71) Applicants: Ziv Zamsky, Raanana (IL); Moshe Anschel, Tel Mond (IL); Itay Keidar, Kfar Saba (IL); Itay S. Peled, Hagur (IL); Doron Schupper, Rehovot (IL); Yakov Tokar, Rishon Lezion (IL)

(72) Inventors: Ziv Zamsky, Raanana (IL); Moshe Anschel, Tel Mond (IL); Itay Keidar, Kfar Saba (IL); Itay S. Peled, Hagur (IL); Doron Schupper, Rehovot (IL); Yakov Tokar, Rishon Lezion (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 384 days.

(21) Appl. No.: 13/952,092

(22) Filed: Jul. 26, 2013

(65) Prior Publication Data
US 2015/0032929 A1 Jan. 29, 2015

(51) Int. Cl.
*G06F 13/14* (2006.01)
*G06F 3/00* (2006.01)
*G06F 13/16* (2006.01)

(52) U.S. Cl.
CPC .................................... *G06F 13/16* (2013.01)

(58) Field of Classification Search
None
See application file for complete search history.

(56) References Cited

U.S. PATENT DOCUMENTS

| | | | |
|---|---|---|---|
| 5,913,049 A | 6/1999 | Shiell et al. | |
| 6,009,516 A * | 12/1999 | Steiss | G06F 9/3861 |
| | | | 712/205 |
| 6,473,832 B1 | 10/2002 | Ramagopal et al. | |
| 2005/0102455 A1 | 5/2005 | Saitoh | |
| 2005/0138098 A1 | 6/2005 | Saha et al. | |
| 2008/0082794 A1 | 4/2008 | Yu et al. | |
| 2009/0228659 A1 * | 9/2009 | Lee | G06F 12/0846 |
| | | | 711/131 |
| 2011/0040939 A1 | 2/2011 | Wilson et al. | |

OTHER PUBLICATIONS

International Application No. PCT/IB2012/053866, International Search Report and Written Opinion, mailed Mar. 25, 2013.

* cited by examiner

*Primary Examiner* — David E Martinez

(57) ABSTRACT

A circuitry for a computing system comprising a first load/store unit, LSU, and a second LSU as well as a memory arrangement. The first LSU is connected to the memory arrangement via a first bus arrangement comprising a first write bus and a first read bus. The second LSU is connected to the memory arrangement via a second bus arrangement comprising a second write bus and a second read bus. The computing system is arranged to carry out a multiple load instruction to read data via the first read bus and the second read bus and/or to carry out a multiple store instruction to write data via the first write bus and the second write bus.

15 Claims, 2 Drawing Sheets

CIRCUITRY FOR A COMPUTING SYSTEM, LSU ARRANGEMENT AND MEMORY ARRANGEMENT AS WELL AS COMPUTING SYSTEM

FIELD OF THE INVENTION

This invention relates to a circuitry for a computing system, a LSU arrangement and a memory arrangement as well as a computing system.

BACKGROUND OF THE INVENTION

Modern computing systems often comprise processors with ever increasing performance capabilities. However, the system performance may be inhibited by the rate of data transfer or the bandwidth of data transfer.

SUMMARY OF THE INVENTION

The present invention provides a circuitry for a computing system, a LSU arrangement and a memory arrangement as well a computing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
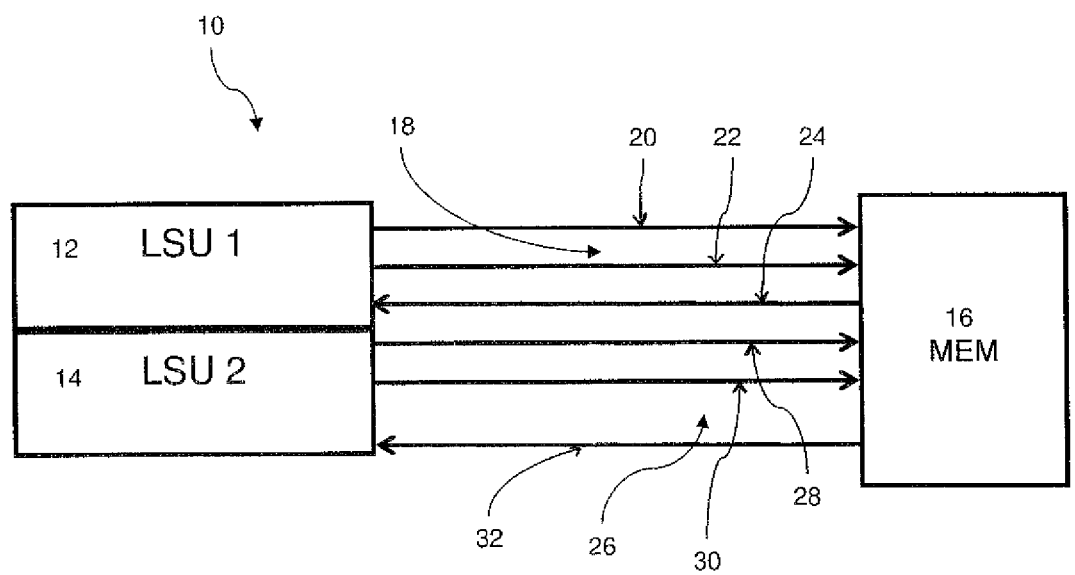
FIG. 1 schematically shows an example of an embodiment of a circuitry for a computing system.

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

In the context of this description, a load/store unit, LSU, is a hardware component of a computing system and/or of a LSU arrangement arranged to manage and/or control and/or perform load instructions and/or store instructions. One or more LSUs may be provided to manage and/or control and/or perform load instructions and/or store instructions. The LSU arrangement may comprise a plurality of LSUs. In particular, a LSU arrangement may comprise two LSUs, three LSUs or more than three LSUs. The LSU arrangement may of example comprise a number of LSUs which is a multiple or a power of two.

The LSU and/or the LSU arrangement may be implemented to be connected to and/or be part of a processor and/or processor core. A LSU may for example be associated to a processor and/or a processor core and manage and/or control and/or perform load instructions and/or store instructions for the processor and/or the processor core, for instance in particular from a processor register to a memory arrangement or vice versa. A load instruction may be an instruction to read data from a memory arrangement, e.g. to be stored in a processor register. A store instruction may be an instruction to write data, in particular from a processor register, to a memory arrangement. The processor register may be directly accessible to a processor or processor core without interaction with a memory management unit. The processor register may be implemented on the processor or processor core. More than one LSU may access the same processor registers, in particular to load data into a processor register or to store data from a processor register to a memory arrangement.

A circuitry for a computing system and/or a computing system may comprise one or more processors. A processor may be a single-core processor or a multi-core processor. A processor may in particular be implemented as a microprocessor, such as a central processing unit (CPU), a digital signal processor, a graphics processor, a microcontroller or other suitable type of microprocessor. It may be envisioned that a LSU arrangement is associated with one or more processors and/or to one or more processor cores. In this respect the term "associate" means that the respective arrangements manages and/or controls and/or performs load instructions and/or store instructions for the respective processor and/or the processor core. For example, each LSU of the arrangement may be associated to a different core and/or processor, multiple LSUs may be associated to the same core and/or processor, a LSU may be associated with multiple cores and/or processors.

A memory arrangement may comprise one or more memory devices, e.g. on-chip memory such as cache memory, RAM and/or external memory like external flash memory. The memory arrangement may comprise a memory management system or unit arranged to manage the memory arrangement. In particular, the memory management unit may be arranged to manage a virtual address space to which physical addresses of memory and devices of a computing system may be mapped. The memory management unit may be arranged to provide memory status information, in particular cache status information, and/or memory attributes. A cache memory may comprise for example a level 1 cache, which may comprise separate instruction and data caches.

A LSU may be connected to the memory arrangement, in particular to a memory management unit, via a bus arrangement. The bus arrangement may be associated exclusively to connect the LSU to the memory arrangement separately from other LSUs. A bus arrangement may comprise an address bus arranged to address specific regions or addresses of the memory arrangement. A bus arrangement may comprise a write bus and/or a read bus. The write bus and the read bus may be separate buses. It may be envisioned that the read bus is arranged to read data from the memory to or under control of a LSU. The write bus may be arranged to write data to memory, for example under control of the LSU, in particular to write data from a processor register. The read bus may be a unidirectional bus. The write bus may be a unidirectional bus. Each LSU may e.g. be connected to the memory arrangement via its own bus arrangement. There may be provided a plurality of bus arrangements or pipelines connecting the memory arrangement to each of the LSUs.

There may be envisioned a circuitry for a computing system and/or a computing system comprising a first LSU and a second LSU. The circuitry and/or computing system may comprise a memory arrangement. It may be envisioned that the first LSU is connected to the memory arrangement via a first bus arrangement comprising a first write bus and a first read bus. The second LSU may be connected to the memory arrangement via a second bus arrangement comprising a second write bus and a second read bus. The circuitry and/or the computing system may be arranged to carry out a multiple load instruction to read data via the first read bus and the second read bus and/or to carry out a multiple store instruction to write data via the first write bus and the second write bus.

The first bus arrangement and the second bus arrangement may be separate bus arrangements comprising separate buses. The first bus arrangement may comprise a first address bus. The second bus arrangement may comprise a second address bus separate of the first address bus and of the second read bus and the second write bus. The first write bus and the second write bus may be unidirectional buses arranged to write data to the memory arrangement. It may be contemplated that the first read bus and the second read bus are unidirectional buses arranged to read data from the memory arrangement.

It may be envisioned that the circuitry and/or computing system comprises one or more additional LSUs. The additional LSUs may be parts of a LSU arrangement, which may be implemented separately of the circuitry and/or computing system. Each of the one or more additional LSUs may be connected to the memory arrangement via its own separate bus arrangement. Each bus arrangement may comprise a write bus and/or a read bus and/or an address bus. The circuitry and/or computing system may be arranged to carry out one or more multiple load instructions to read data via two or more of the read buses and/or to carry out one or more multiple store instructions to write data via two or more of the write buses.

The circuitry may e.g. be implemented as part of a computing system and/or processor arrangement, e.g. a digital signal processor, a microprocessor and/or a microcontroller, a memory unit or other type of logic circuit. The circuitry may be implemented as a single integrated circuit, for example as a single or multiple dies provided in a single integrated circuit package. The integrated circuit may for instance comprise a processor or processor core comprising the LSUs. The computing system may comprise at least one circuitry as described herein.

The multiple load instruction may be carried out such that data is read via at least two of the read buses of a LSU arrangement. A multiple load instruction may be a single instruction arranged to read data from memory via at least two read buses of the LSUs. It may be envisioned that a LSU is arranged to utilize the read bus associated to it and at least one other read bus of one or more other LSUs to carry out a multiple load instruction. In the event that a LSU arrangement and/or a circuitry and/or a computing system comprises more than two LSUs, there may be defined different multiple load instructions which may utilize different numbers and/or different arrangements of read buses of the LSUs. A multiple store instruction may be carried out such that data is written to memory via at least two of the write buses of a LSU arrangement. It may be envisioned that a LSU is arranged to utilize the write bus associated to it and at least one other write bus of one or more other LSUs to carry out a multiple store instruction. A multiple store instruction may be a single instruction arranged to write data via at least two write buses of the LSUs. In the event that a LSU arrangement and/or a circuitry and/or acomputing system comprises more than two LSUs, there may be defined different multiple store instructions which may utilize different numbers and/or different arrangements of write buses of the LSUs. The circuitry and/or computing system and/or the LSU arrangement and/or the memory arrangement is arranged to carry out a multiple load instruction such that data is read via the read buses simultaneously. The circuitry and/or computing system and/or the LSU arrangement and/or the memory arrangement may be arranged to carry out a multiple store instruction such that data is written via the write buses simultaneously. Generally, the circuitry and/or computing system and/or the LSU arrangement and/or the memory arrangement may be arranged to carry out a multiple store instruction in parallel and/or simultaneously to a multiple load instruction. Accordingly, the full bandwidth of the respective bus arrangements may be used and neither the write buses nor the read buses are idle. A multiple load instruction may be arranged to read data at consecutive addresses and/or a multiple store instruction is arranged to write data at consecutive addresses. In this case it is possible to pass only few parameters to read and/or write comparatively large blocks of data with a single instruction and utilizing the full bandwidth provided by the bus arrangements of the LSUs.

FIG. 1 schematically shows an example of an embodiment of a circuitry for a computing system 10. The circuitry for a computing system 10 may comprise a LSU arrangement comprising a plurality of LSUs. In the example there are shown a first LSU 12 (LSU 1) and a second LSU 14 (LSU 2). The circuitry 10 may comprise a memory arrangement 16, which may, for example, comprise a cache memory or a RAM. LSU 1 may be connected to the memory arrangement 16 via a first bus arrangement 18.

The first bus arrangement may comprise a first address bus 20 and/or a first write bus 22 and/or a first read bus 24. The arrows in FIG. 1 indicate that the first address bus 20 and/or the first write bus 22 may be unidirectional buses via which data may only be transferred to the memory arrangement 16. The first read bus 24 may be a unidirectional bus via which data may only be transferred from the memory arrangement 16, and not to the memory arrangement 16.

LSU 2 may be connected to the memory arrangement 16 via a second bus arrangement 26. The second bus arrangement 26 may comprise a second address bus 28 and/or a second write bus 30 and/or a second read bus 32. The arrows in FIG. 1 indicate that the second address bus 28 and/or the second write bus 30 may be unidirectional buses via which data may only be transferred to the memory arrangement 16. The second read bus 32 may be a unidirectional bus via which data may only be transferred from the memory arrangement 16, but not to the memory arrangement 16.

The circuitry 10, in particular the load/store arrangement and/or the memory arrangement 16, may be arranged to carry out a multiple load instruction and/or a multiple store instruction. There may be defined a multiple load instruction LOAD×2. The instruction LOAD×2 may be defined such that it causes the LSU 1 or the LSU 2 to simultaneously read data from the memory arrangement 16 via the read buses 24, 32 associated to LSU 1 and LSU 2. The multiple store instruction STORE×2 may be defined such that it causes the LSU 1 or the LSU 2 to write data simultaneously to the memory arrangement 16 via the write buses 22, 30 associated to LSU 1 and LSU 2. Accordingly, one LSU may utilize the read bus and/or write bus of another LSU to ensure that the full read bandwidth of the LSU arrangement may be utilized with one instruction. The data read or written via multiple store or load instructions may be consecutive data.

Multiple store instructions or multiple load instructions accessing non-consecutive registers and/or memory addresses may be defined. In this case, the instructions may require and use an extended parameter list to identify the registers or addresses to be accessed for reading and/or writing. For LSU arrangements there may be defined LOAD×N and/or STORE×N instructions which may provide multiple loading or multiple storing using N read or write buses, wherein N may be at least 2 and at most be equal to the total number M of LSUs with corresponding bus arrangements available. The circuitry and/or the LSU arrangement and/or the memory arrangement may be arranged to carry out a multiple store and multiple load instruction in parallel and/or simultaneously, for example a combination of LOAD×2 STORE×2. Accordingly, the bandwidth provided by the separate buses of the bus arrangements may be used in full, which may considerably speed up programs, in particular programs requiring a significant amount of memory access, for example for heavy number-crunching in science and research or for video processing.

Although the example of FIG. 1 comprises both an LSU arrangement and a memory arrangement, both arrangements may be implemented separately. For example, there may be contemplated a LSU arrangement for a computing system. The LSU arrangement may comprise any of the features described herein. In particular, the LSU arrangement may comprise a first LSU and a second LSU. The first LSU may be connected or connectable to a memory arrangement via a first bus arrangement comprising a first write bus and a first read bus. The second LSU may be connected or connectable to the memory arrangement via a second bus arrangement comprising a second write bus and a second read bus. The LSU arrangement may comprise more than two LSUs which may be connectable or connected to a memory arrangement via corresponding bus arrangements. The LSU arrangement may be arranged to carry out a multiple load instruction to read data via the first read bus and the second read bus and/or to carry out a multiple store instruction to write data via the first write bus and the second write bus. The LSU arrangement may be implemented as an integrated circuit.

Additionally, the memory arrangement memory arrangement may be connected or connectable to first LSU via a first bus arrangement comprising a first write bus and a first read bus and may be connected or connectable to a second LSU via a second bus arrangement comprising a second write bus and a second read bus. The memory arrangement is connected, or connectable, to a corresponding LSU arrangement. The memory arrangement may be connected to additional LSUs via corresponding bus arrangements. The memory arrangement is arranged to carry out a multiple load instruction to read data via the first read bus and the second read bus and/or to carry out a multiple store instruction to write data via the first write bus and the second write bus.

Figure 2:
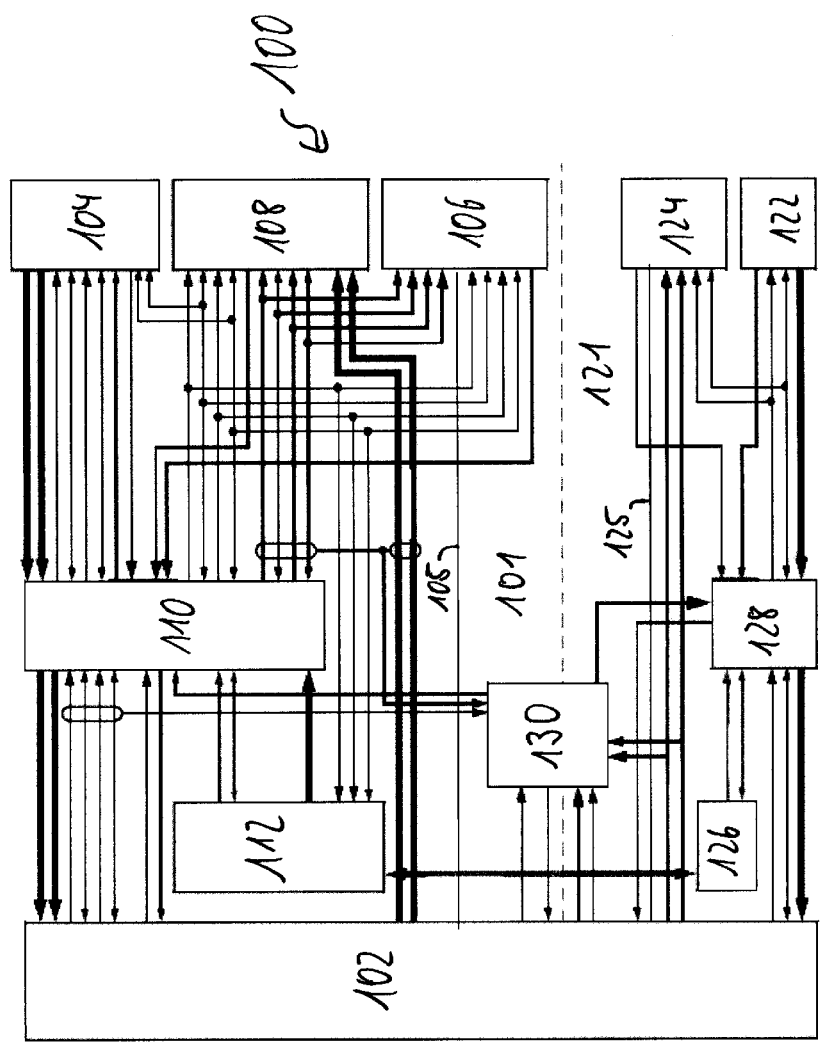
FIG. 2 schematically shows an example of a computing system.

FIG. 2 schematically shows an example of a computing system 100. The example shown in FIG. 2 comprises a first arrangement of a processor core 102, instruction memory management unit 124 and data connection 125 and a second arrangement of processor core 102, data memory management unit 106 and data connection 105, respectively, as examples of a circuitry 10 as outlined above with reference to FIG. 1. The computing system 100 comprises at least one processor core 102, although in FIG. 2 a single core is shown the system 100 (or any of the arrangements) may alternatively be a multi-core, such as comprising two, four, eight, sixteen or more cores. The computing system 100 may for example be a microprocessor, such as a central processing unit (CPU, a digital signal processor, a graphics processor, a microcontroller or other suitable type of microprocessor.

As shown, the computing system 100 may comprise a level 1 cache arrangement. The computing system 100 may in particular be a digital signal processor (DSP) device comprising one or more processor cores 102 and/or a level 1 cache arrangement, which may comprise separate instruction and data caches. In particular, it may comprise a data cache 104. There may be provided a data memory management unit 106 associated to the data cache 104. The data memory management unit 106 may be connected for data transfer with processor core 102 via a data connection 105, which may comprise a first and a second write bus as well as a first and a second read bus associated to the data cache plane 101. As shown, one or more additional data cache control units 108, 110, 112 may be present, arranged for managing data flows from and to the data cache 104 and/or for detecting and managing cache misses and/or controlling the functions and communications of the data cache 104. Data lines may be provided to connect the data cache 104 to its associated devices 106, 108, 110 and/or to connect the associated devices to each other and/or to the processor core 102.

The data cache 104 and its associated components 106, 108, 110 may be arranged to form parts of a data cache plane 101, as an example of a memory arrangement. The system 100 may be provided with an instruction cache plane 121, as another example of a memory arrangement. The instruction cache plane 121 may comprise an instruction cache 122. An instruction memory management unit 124 may be associated to the instruction cache 122. The instruction memory management unit 124 may be connected for data transfer with processor core 102 via a data connection 125, which may comprise a first and a second write bus and a first and a second read bus associated to the instruction cache plane 121.

The instruction cache plane 121 may further comprise one or more additional devices 126, 128 arranged for managing data flows from and to the instruction cache 122 and/or for detecting and managing cache misses and/or controlling the functions and communications of the instruction cache 122. It may be envisioned that data lines are provided to connect the instruction cache 122 to its associated devices 126, 128 and/or to connect the associated devices 126, 128 to each other and/or to the processor core 102. There may be provided data lines connecting components of the instruction cache plane 121 with elements of the data cache plane 101 for data transfer.

As shown, a data transfer unit 130 may be part of the computing arrangement 100. The data transfer unit 130 may be connected via suitable lines to components of the instruction cache plane 121 and/or the data cache plane 101.

Components of the data cache plane 101 and/or the instruction cache plane 121 may be connected to the processor core 102 via suitable lines for transferring data. The processor core 102 may comprise one or more than one LSUs, in particular a first LSU and a second LSU as described above (not shown) associated and/or connected to the data cache plane 101 via the data connection 105. The processor core 102 may, alternatively or additionally, comprise a first LSU and a second LSU as described above (not shown) associated and/or connected to the instruction cache plane 121 via the data connection 125.

The data memory management unit 106 and/or the instruction memory management unit 124 may be arranged to be part of a circuitry 10 as described above. In particular, the processor core 102 and/or corresponding LSUs of the processor core 102 may be arranged to read and/or write to the data memory management unit 106 and/or the instruction memory management unit 124 via the respectively associated data connections 105 and 125 representing associated bus arrangements as described above. In particular, the processor core 102 and/or the data cache plane 101 and/or the instruction cache plane 121 may be arranged to carry out a multiple write instruction and/or a multiple read instruction as described above. The processor core 102 and/or the data cache plane 101 and/or the instruction cache plane 121 may be arranged to carry out a multiple write instruction and/or a multiple read instruction as described above.

The circuitry, the computing system, the LSU arrangement and the memory arrangement described allow improved utilization of the bandwidth provided in system utilizing a plurality of LSUs with separate read and write buses.

The computing system may for instance include at least one processing unit, associated memory and a number of input/output (I/O) devices. The computing system may comprise the circuitry described herein as well as additional memory and/or devices, e.g., RAM memory, graphic and/or audio devices, peripheral devices, I/O-interfaces, etc. The computing system may generally be any kind of system comprising a processor. The computing system may be a bare-bone system, which may be extended by additional components. The computing system may be a System-on-a-Chip, a mobile system, e.g., a handheld device like a smartphone, a mobile phone or a tablet, a netbook or laptop, a desktop system or workstation. The computing system may comprise one or more processors. A processor may a single-core or multi-core processor, for example an ARM-based processor, a Power-based processor, an x86-based processor or a processor of the SPARC family. The processor may e.g. be a digital signal processor, a microprocessor and/or a microcontroller and/or be a multi-threaded processor. A memory management unit may be representative of a memory management device or system comprising one or more sub-units or sub-devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections or buses as discussed herein may be any type of connection suitable to transfer signals from or to the respective nodes, units or devices, for example via intermediate devices. Accordingly, unless implied or stated otherwise, the connections may for example be direct connections or indirect connections. The connections or buses may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Therefore, many options exist for transferring signals or data.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the memory arrangement may comprise several different memory subsystems, such as RAM, different level of caches, etc. The memory arrangement may comprise a memory management unit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, one or more LSUs may be implemented on a processor or a chip or package of the processor. Alternatively, the examples may be implemented as any number of separate integrated circuits or separate devices interconnected with each other in a suitable manner. For example, a memory management unit may be arranged separately from the memory.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A circuitry for a computing system, comprising:
 a first load store unit (LSU);
 a second LSU;
 a memory arrangement;
 the first LSU being connected to the memory arrangement via a first bus arrangement comprising a first write bus and a first read bus, the first bus arrangement further comprising a first address bus connecting the first LSU and the memory arrangement;

the second LSU being connected to the memory arrangement via a second bus arrangement comprising a second write bus and a second read bus;

wherein the circuitry is arranged to carry out a multiple load instruction to cause the first LSU to simultaneously read data from the memory arrangement via the first read bus and the second read bus; and wherein the multiple load instruction causes the first LSU to read data from a first address of the memory arrangement propagated over the first address bus and to read data from a second address of the memory arrangement, the second address consecutive to the first address in the memory arrangement.

2. The circuitry according to claim 1, wherein the first write bus and the second write bus are unidirectional buses arranged to write data to the memory arrangement and the first read bus and the second read bus are unidirectional buses arranged to read data from the memory arrangement.

3. The circuitry according to claim 1, the memory arrangement comprising at least one of a cache, a RAM or an external memory.

4. The circuitry according to claim 1, the circuitry comprising one or more additional LSUs.

5. The circuitry according to claim 4, each of the one or more additional LSUs being connected to the memory arrangement via a bus arrangement comprising a write bus and a read bus, wherein the circuitry is arranged to carry out one or more multiple load instructions to read data via two or more of the read buses.

6. The circuitry according to claim 1, further being arranged to carry out a multiple store instruction in parallel to the multiple load instruction.

7. A load store unit (LSU) arrangement for a computing system, comprising:
a first LSU;
a second LSU;
the first LSU being connected to a memory arrangement via a first read bus, the first bus arrangement further comprising a first address bus connecting the first LSU and the memory arrangement; arrangement comprising a first write bus and a first read bus;
the second LSU being connected to the memory arrangement via a second bus arrangement comprising a second write bus and a second read bus;
wherein the LSU arrangement is arranged to carry out a multiple store instruction to cause the first LSU to simultaneously write data to the memory arrangement via the first write bus and the second write bus; and
wherein the multiple store instruction causes the first LSU to write data to a first address of the memory arrangement propagated over the first address bus and to write data to a second address of the memory arrangement, the second address consecutive to the first address in the memory arrangement.

8. The LSU arrangement of claim 7, wherein the LSU arrangement is arranged to carry out a multiple load instruction to cause the second LSU to simultaneously read data from the memory arrangement via the first read bus and the second read bus.

9. The LSU arrangement of claim 8, wherein the multiple load instruction and the multiple store instruction are carried out in parallel and data is transferred over the first write bus, the first read bus, the second write bus, and the second read bus simultaneously.

10. The LSU arrangement of claim 7, wherein the first write bus and the second write bus are unidirectional buses arranged to write data to the memory arrangement and the first read bus and the second read bus are unidirectional buses arranged to read data from the memory arrangement.

11. A circuitry for a computing system, comprising:
a first load store unit (LSU);
a second LSU;
a memory arrangement;
the first LSU being connected to the memory arrangement via a first bus arrangement comprising a first write bus and a first read bus, the first bus arrangement further comprising a first address bus connecting the first LSU and the memory arrangement;
the second LSU being connected to the memory arrangement via a second bus arrangement comprising a second write bus and a second read bus;
wherein the circuitry is arranged to carry out a multiple store instruction to cause the first LSU to simultaneously write data to the memory arrangement via the first write bus and the second write bus; and
wherein the multiple store instruction causes the first LSU to write data to a first address of the memory arrangement propagated over the first address bus and to write data to a second address of the memory arrangement, the second address consecutive to the first address in the memory arrangement.

12. The circuitry of claim 11, wherein the circuitry is configured to carry out a multiple load instruction to cause the second LSU to simultaneously read data from the memory arrangement via the first read bus and the second read bus.

13. The circuitry of claim 12, wherein the multiple load instruction and the multiple store instruction are carried out in parallel and data is transferred over the first write bus, the first read bus, the second write bus, and the second read bus simultaneously.

14. The circuitry of claim 12, the second bus arrangement further comprising a second address bus connecting the second LSU and the memory arrangement, wherein the multiple load instruction causes the second LSU to read data from a first address of the memory arrangement propagated over the second address bus and to read data from a second address of the memory arrangement, the second address consecutive to the first address in the memory arrangement.

15. The circuitry of claim 11, wherein the first write bus and the second write bus are unidirectional buses arranged to write data to the memory arrangement and the first read bus and the second read bus are unidirectional buses arranged to read data from the memory arrangement.

* * * * *